United States Patent

Casey et al.

[11] Patent Number: 5,774,542
[45] Date of Patent: Jun. 30, 1998

[54] SNAP-IN COVER FOR A PAYPHONE NUMBER PLATE

[75] Inventors: Leo Francis Casey, Lexington; David Michael Otten, Newton; Thomas Hamilton Warner, Bedford, all of Mass.

[73] Assignee: International Totalizing Systems, Inc., Bradford, Mass.

[21] Appl. No.: 880,020

[22] Filed: Jun. 20, 1997

Related U.S. Application Data

[63] Continuation of Ser. No. 525,417, Sep. 8, 1995, abandoned.

[51] Int. Cl.$^6$ .............................. H04M 1/00; G09F 3/18; G09F 3/20
[52] U.S. Cl. ......................... 379/433; 379/428; 379/447; 379/450; 40/661; 40/653
[58] Field of Search ..................................... 379/453, 428, 379/433, 434, 447, 450; 40/661, 653, 649

[56] References Cited

U.S. PATENT DOCUMENTS 3,110,119 11/1963 Reiner ........................................ 40/653
5,461,810 10/1995 Goserud ..................................... 40/661

Primary Examiner—Jack Chiang
Attorney, Agent, or Firm—Merchant, Gould, Smith, Edell, Welter & Schmidt

[57] ABSTRACT

A plastic number plate cover that can be installed from the exterior of the housing faceplate of a public telephone and which is resistant to tampering. The cover includes an envelope-shaped pocket into which a number plate or card is inserted, and opposed cantilever arms each terminating in a tab having a beveled edge. The cover is inserted into a rectangular-shaped recess on the faceplate when the tabs are brought into contact with a recess edge, causing the arms to flex and allowing the beveled edges to slide past the recess edge. The cover may be fixed or removable once installed within the faceplate, depending on the structure of the tabs.

23 Claims, 6 Drawing Sheets

SNAP-IN COVER FOR A PAYPHONE NUMBER PLATE

This is a file-wrapper continuation of application Ser. No. 08/525,417, filed Sep. 8, 1995 now abandoned.

BACKGROUND OF THE INVENTION

1. Field of the Invention

This invention is directed to a snap-in cover for protecting a number plate or card, imprinted with the phone number of a pay telephone, which can be installed from the exterior of a telephone housing, and optionally, which may be removable from the exterior of the telephone housing.

Although the preferred embodiment is adapted for use as a payphone number cover, the principles of the invention can be adapted to other applications requiring an information display to be protected from vandalism while remaining accessible for replacement from the exterior of a display mounting assembly.

2. Description of Related Art

Telephone sets, whether desk-top or wall-mounted, public or private, typically have some type of number plate or card showing the telephone's number. The need for a visible identifying number is particularly critical for public telephones due to the transient nature of users wishing to receive incoming calls. Whatever the type of telephone, the number is printed or embossed on a number plate or card, typically a paper strip or plastic tape, which is protected by a transparent plastic cover.

Private telephones often use a cover that can be easily installed and removed so that changing the underlying number card is a simple operation. Easy removal also facilitates changing a card or cover for cosmetic reasons such as marring of the plastic, or staining of the card. To facilitate removal, a pry point is often incorporated into the cover.

FIG. 1 shows one such cover made from a transparent plastic, wherein the two cover ends snap into cut-out receptacles in the telephone housing. A slot at one end provides a means for removing the cover by inserting a lever into the slot to pop the end out of the receptacle.

Because vandalism is a critical concern, public telephones do not in general, include components that are easily removable from outside the telephone housing. Therefore, no pry-point or other access point is incorporated into the housing exterior surface. Although there are substantial benefits to payphones having an easily removable cover and number plate, Western Electric style public telephones now universally use covers which must be installed and removed from the interior of the housing requiring the removal of several internal components to gain access to the number plate recess and the subsequent reassembly of these parts. Because the destination of any particular new unit usually is not determined until the day it is deployed, the number plate and cover are added when the payphone is installed in the field, requiring considerable on-site labor by a technician. If subsequently a number needs to be changed or a damaged cover needs to be replaced, then access to the housing interior and disassembly and reassembly of the internal components will again be required, with concomitant expenditure of time and effort.

FIG. 2 shows a number plate assembly kit presently in wide use for public telephones which includes a plastic cover rigidly fixed between a metal backing strip and a chrome faceplate. A raised transparent window on the cover fits into a rectangular aperture in the faceplate, the number plate being sandwiched between the cover window and the backing strip. The backing strip is attached by nuts to threaded posts mounted on the faceplate interior surface.

Although the components of public telephones are not easily removable from outside the telephone housing, vandalism still occurs. Furthermore, the number plate and cover must be capable of field installation, rather than permanently installed by the manufacturer. Therefore, there is a need in the art for an improved pay phone number plate cover.

SUMMARY OF THE INVENTION

To overcome the limitations in the prior art described above, and to overcome other limitations that will become apparent upon reading and understanding the present specification, the present invention discloses a protective cover that can be installed from the exterior of a pay telephone housing, and optionally, which may be removable from the exterior of the pay telephone housing. The protective cover has a generally rectangular envelope-shaped configuration determined by opposed first (upper) and second (lower) parallel planar surfaces which are bounded longitudinally by a first (top) planar edge surface generally orthogonal to the upper surface, and generally orthogonal to the lower surface. The upper and lower surfaces are bounded laterally by generally orthogonal, opposed second (left) and third (right) planar edge surfaces. A fourth (bottom) planar edge surface, generally parallel to the top edge surface and generally orthogonal to the upper, lower, left and right surfaces, includes a narrow longitudinal slot extending into the body to form a pocket for closely receiving a number plate or card. The pocket is determined by a generally planar first (upper) interior surface and a second (lower) interior surface on which first, second and third number plate support projections are symmetrically disposed. The projections have a narrow clearance with respect to the upper interior surface, preventing the number card or plate from sliding out after being inserted into the pocket. The lower planar surface includes a downwardly open longitudinal slot disposed proximate to the bottom planar edge surface, bounded by a generally planar longitudinal edge generally orthogonal to the bottom surface, and by opposed first and second cantilevered arms symmetrically disposed with respect to the slot median, the gap between the arms determining the downward opening. Each arm terminates in a tapered tab having a generally planar upper surface and a beveled lower surface, so that the edge orthogonal to the two surfaces is also beveled.

Prior to shipping a pay telephone, a metal backing plate is installed inside the housing, so that once a number plate or card has been inserted into the pocket, the cover can be closely received by and snapped into place within a rectangular-shaped recess, backed by the backing plate, on the faceplate's exterior surface.

The installation of the cover is accomplished by first engaging the top edge of the cover with the top edge of the recess, and then pushing the cover downwards perpendicular the surface along its bottom edge so that the beveled edges on the tabs of the cantilevered arms come in contact with the bottom edge of the recess, causing the arms to flex upwardly into the cover until they can be pushed into the recess, whereupon, due to the resiliency of the arms, the tabs exert downward pressure against the recess bottom wall, thus preventing the cover from easily being removed. The cover is pushed into the recess until its lower surface contacts the backing plate.

The cover can be made so that it can be removed from the exterior of the faceplate if the tab angles out smoothly from the cantilevered arm. This cover can be removed by inserting thin, flexible shims between the left and right cover edge surfaces and the contiguous recess walls and sliding the shims toward each other. This action raises the cantilevered arms so that the tapered tabs slightly clear the recess' lower edge. The cover can then easily be popped out. It is even possible to use a single flexible shim (such as a thin plastic card) to raise both arms and then pop the cover out.

It is also possible to implement the cover so that it cannot be removed by having the tab join the cantilevered arm at an abrupt angle. The flexible shims used with this cover will catch on the tabs and will not be able to deflect the arms upwards.

A more complete understanding of the present invention and objects, aspects and advantages thereof will be gained from a consideration of the following description of the preferred embodiment read in conjunction with the accompanying drawings provided herein.

BRIEF DESCRIPTION OF THE DRAWINGS

Referring now to the drawings in which like reference numbers represent corresponding parts throughout.

DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
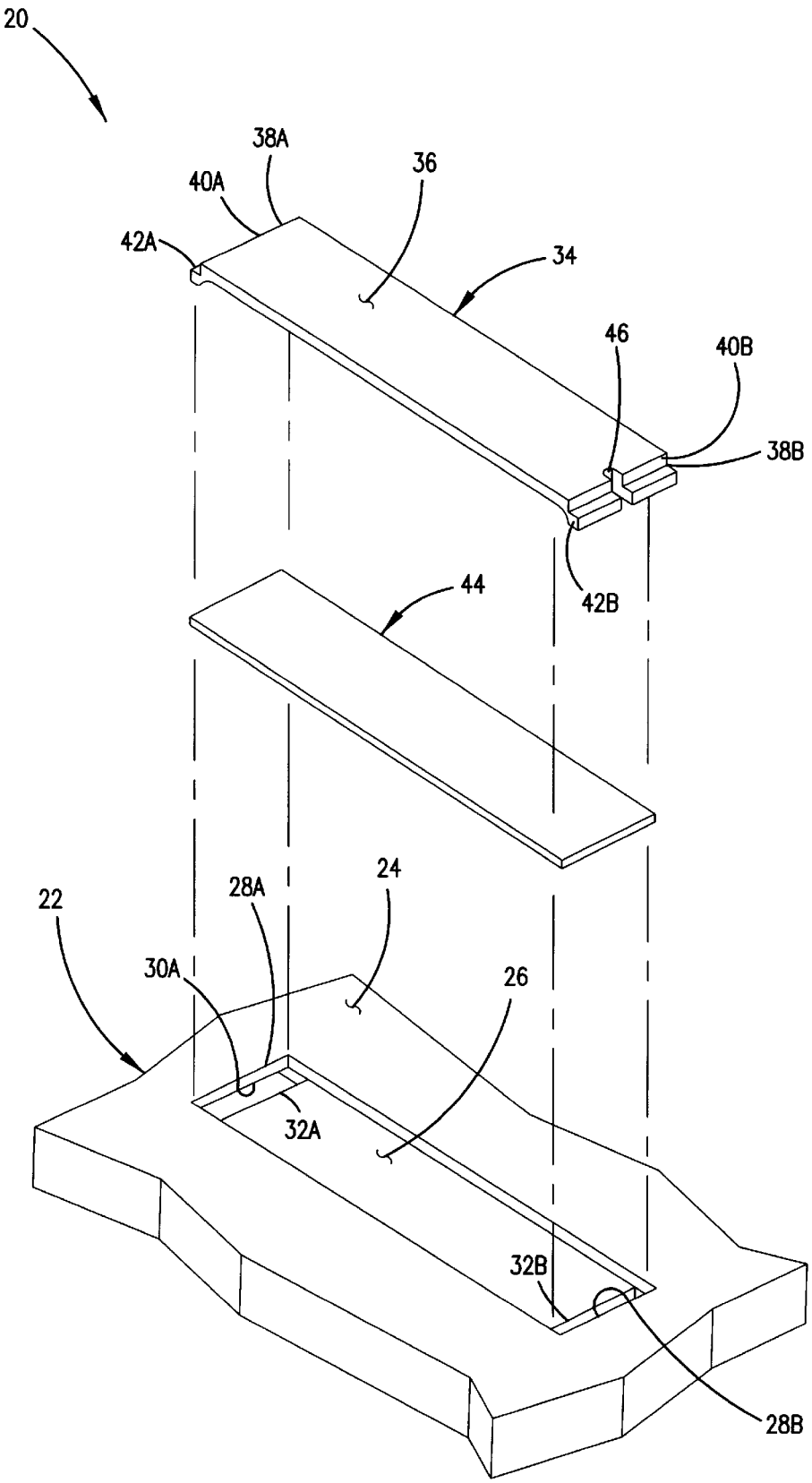
FIG. 1 is an exploded perspective view of a cover, number plate, and housing faceplate commonly used for a private telephone.

As a basis of comparison to the present invention, FIG. 1 shows a cover assembly 20 widely used for desk-top and wall-mounted private telephones where protection against vandalism is not an issue. The assembly 20 includes a plastic housing faceplate 22 with a planar exterior surface 24 having therethrough a generally rectangular aperture 26 bounded longitudinally by opposed first and second edges 28A, 28B generally orthogonal to the surface 24, the edges 28A, 28B including, respectively, a transverse slotted receptacle 30A, and 30B (not shown), and a lower lip 32A, 32B. Assembly 20 further includes a generally rectangular plastic cover 34 with a transparent face 36, the cover 34 having opposed first and second ends 38A, 38B, each end having, respectively, an edge portion 40A, 40B generally orthogonal to the face 36, and a tab 42A, 42B generally orthogonal, respectively, to the edge portion 40A, 40B, and generally parallel to the face 36. A number card 44 sized to overlap lips 32A, 32B is interposed between the cover 34 and the aperture 26, and cover 34 is snapped into place onto faceplate 22 by engaging tabs 42A, 42B within, respectively, receptacles 30A, 30B. Cover 34 is easily removed by inserting a thin lever such as a small screwdriver blade into a slot 46 in end 38B and applying a lateral force to pop the tab 42B out of receptacle 30B.

Figure 2:
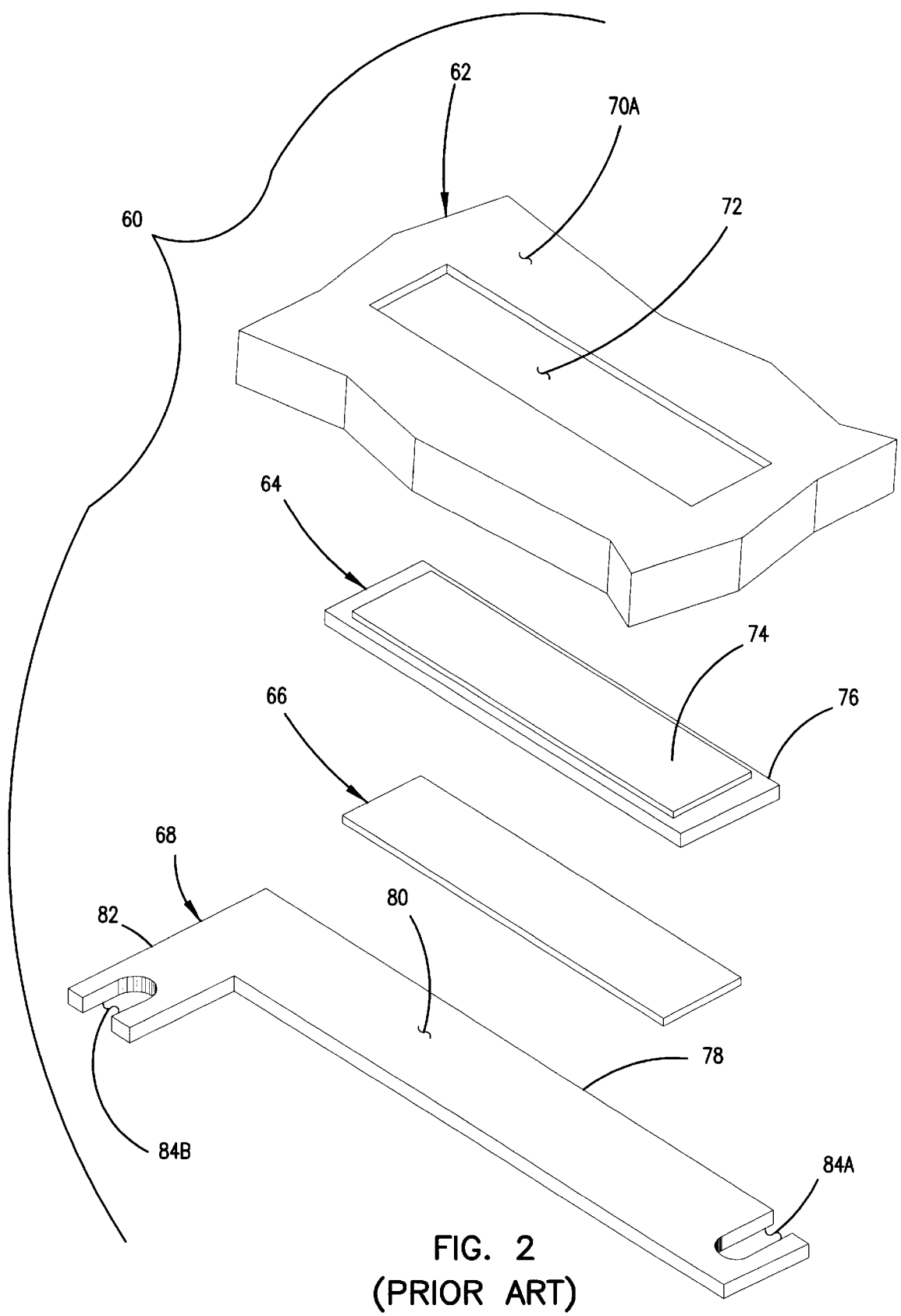
FIG. 2 is an exploded perspective view of a number plate assembly presently used for public telephones, including a housing faceplate, cover, number plate, and metal backing plate.

As a more direct basis of comparison to the present invention, FIG. 2 shows a number plate assembly 60 widely used for public telephones. The assembly 60 includes a chrome housing faceplate 62, a plastic cover 64, a number plate 66, and a metal backing plate 68. Faceplate 62 includes a planar exterior surface 70A and a planar interior surface 70B (not shown) parallel to the surface 70A, the surfaces having therethrough a generally rectangular aperture 72. Cover 64 includes a generally rectangular transparent window 74 raised with respect to a generally rectangular base 76, the window 74 sized to be closely received within the aperture 72. Backing plate 68 includes a generally rectangular first portion 78 having a planar surface 80, and a second portion 82 generally orthogonal to the portion 78. Portions 78 and 82 include, respectively, arcuately-shaped slots 84A, 84B. After the number plate 66 is positioned between the surface 80 and the cover window 74, the window is inserted into aperture 72, and the backing plate 68 is secured to the faceplate 62 by inserting threaded posts 86A (not shown), 86B (not shown) extending from interior surface 70B into slots 84A, 84B, respectively, and tightening nuts 88A (not shown), 88B (not shown) onto, respectively, posts 86A, 86B.

Figure 3:
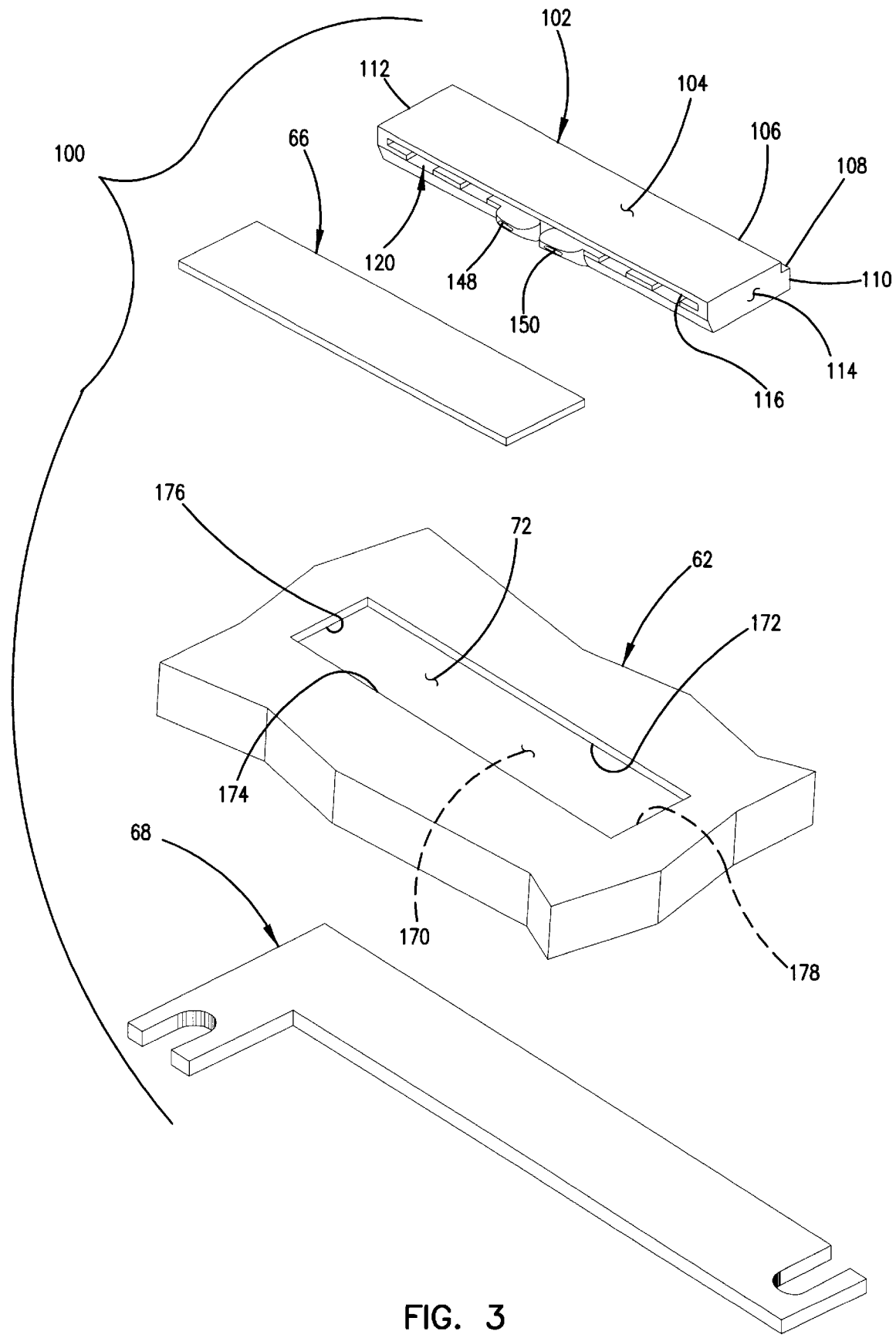
FIG. 3 is an exploded perspective view of a number plate assembly for public telephones, including a cover of the present invention, a number plate, housing faceplate, and metal backing plate.
Figure 4:
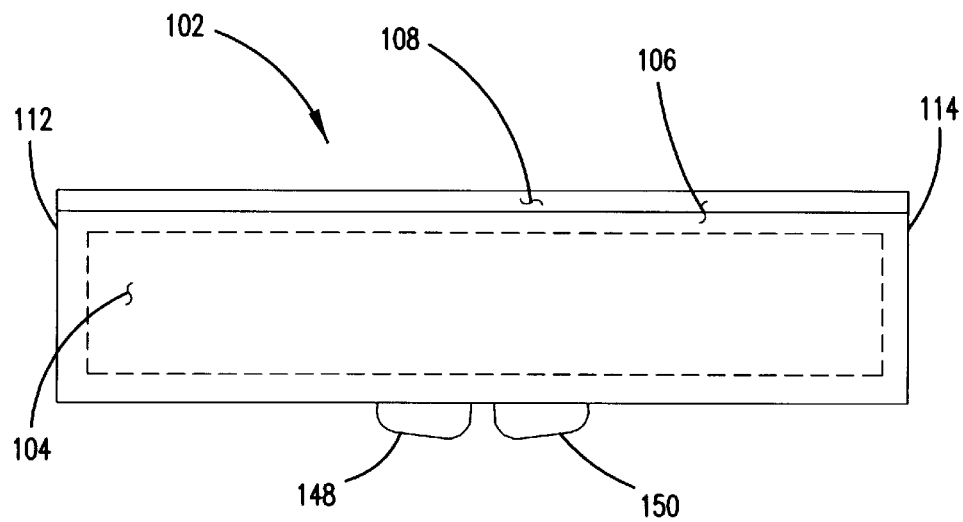
FIG. 4 is an upper plan view of the FIG. 3 cover.

FIG. 3 shows a number plate assembly 100 for public telephones which includes a cover 102 of the present invention, and also includes the faceplate 62, number plate 66, and metal backing plate 68 shown in FIG. 2.

Figure 5:
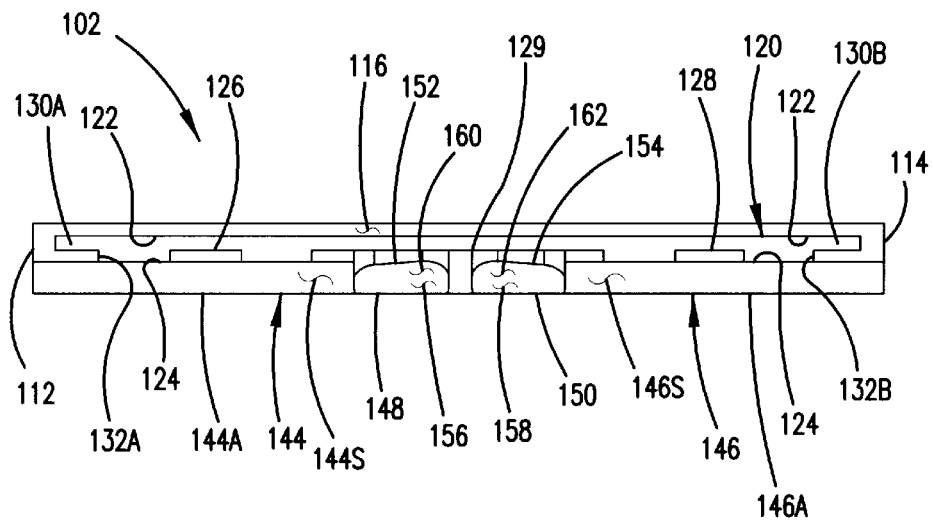
FIG. 5 is a bottom elevational view of the FIG. 3 cover.

Referring to FIGS. 3, 4, 6, 8, and 9, the cover 102 is fabricated from a right rectangular parallelepiped and includes opposed first (upper) and second (lower) generally planar parallel faces 104, 105, wherein the face 104 forms a longitudinal lip 108 in an upper longitudinal portion 106 that is generally parallel to face 104 and generally orthogonal to a first (top) planar edge surface 110. Surface 110 is generally orthogonal to faces 104 and 105. Cover 102 further includes opposed second (left) and third (right) generally parallel and planar lateral faces 112, 114, that are generally orthogonal to the faces 104, 105. As shown in FIGS. 3 and 5, a relatively thin second (bottom) planar edge surface 116 is generally orthogonal to faces 104, 112 and 114.

Figure 7:
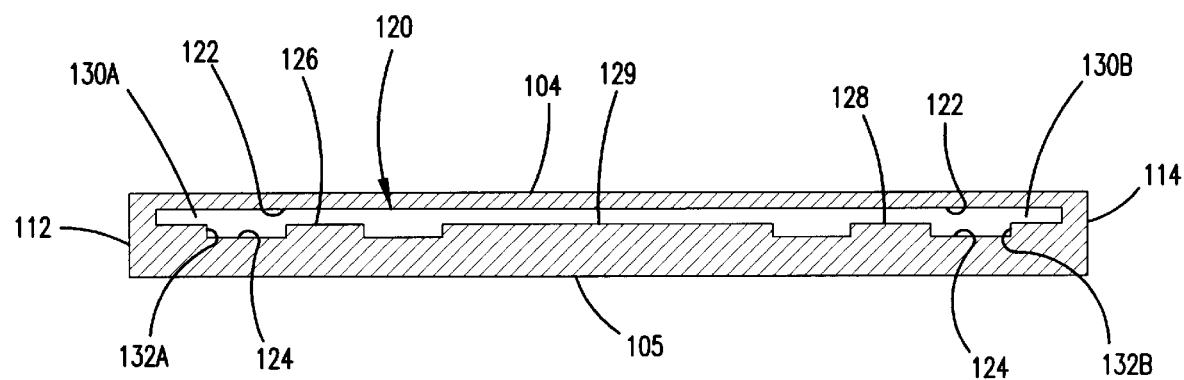
FIG. 7 is a sectional view along the line A—A of FIG. 6.
Figure 8:
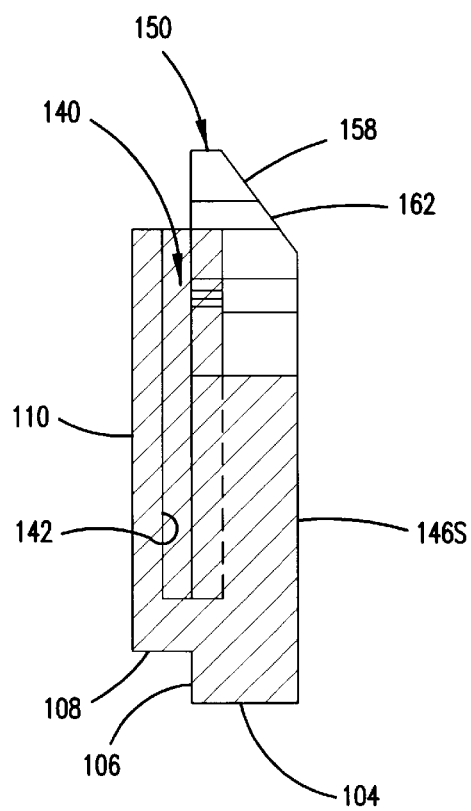
FIG. 8 is a sectional view along the line B—B of FIG. 6.

Referring to FIGS. 5 and 7, a narrow longitudinal slot 120 symmetrically disposed between lateral faces 112 and 114 is determined in the plane of edge surface 116 by opposed generally planar and parallel first (upper) and second (lower) interior surfaces 122, 124, respectively. Thus, faces 104, 105, 112, 114, edge surface 110, and slot 120 determine a generally rectangular envelope-shaped pocket 125 (not shown). That is, pocket 125 is the transverse extension of planar slot 120. Opposed first and second number plate support projections 126, 128 depend upwardly from surface 124 and are disposed symmetrically with respect to a third number plate support projection 129. Slot 120 and therefore pocket 125 terminate in opposed, symmetric first and second recesses 130A, 130B extending from edges 132A, 132B, respectively, the edges being proximate to, respectively, the projections 126, 128.

Referring to FIGS. 5, 6, 8 and 9, the lower face 105 includes a downwardly open longitudinal slot 140 determined by a generally planar longitudinal, rectilinear edge 142 distal to the edge surface 116 and generally orthogonal to face 105, and by opposed first and second cantilevered arms 144, 146 symmetrically disposed with respect to the slot median and canted at an angle α (shown in FIG. 6) with respect to edge 142. Arms 144, 146 include, respectively, a central portion 144A, 146A including, respectively, a planar edge surface 144S, 146S, and terminate, respectively, in a tab 148, 150 tapering outwardly at an angle β (shown in FIG. 6) from central portion 144A, 146A, respectively. Tabs 148, 150 include, respectively, a generally planar upper surface 152, 154, and a beveled lower surface 156, 158, so that edges 160, 162 which are orthogonal to the surfaces 152, 156, and 154, 158, respectively, are also beveled, the edges 160, 162 each including an apex portion generally parallel to the edge surface 116.

Figure 6:
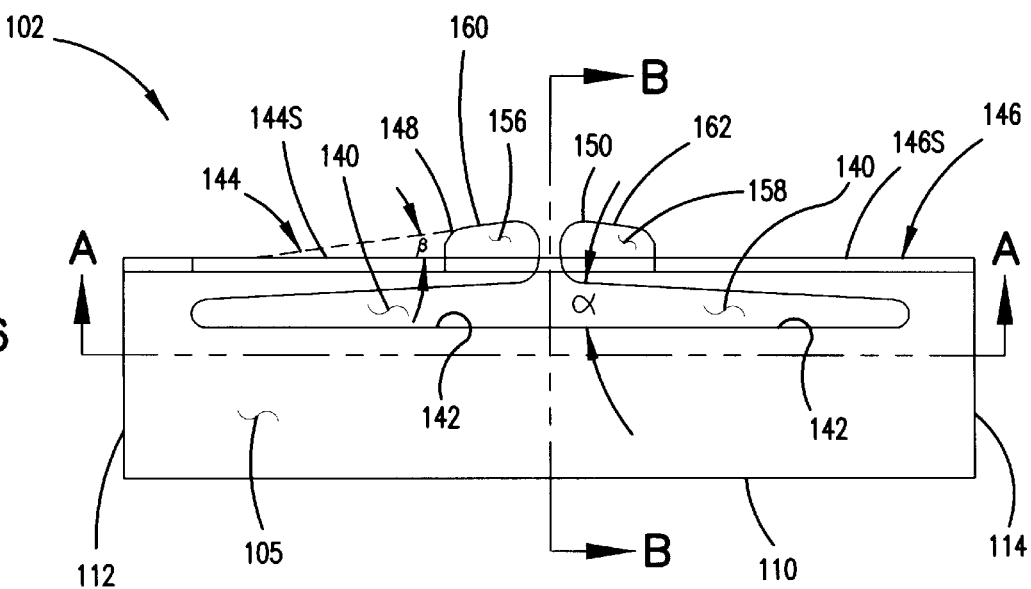
FIG. 6 is a lower plan view of the FIG. 3 cover.
Figure 9:
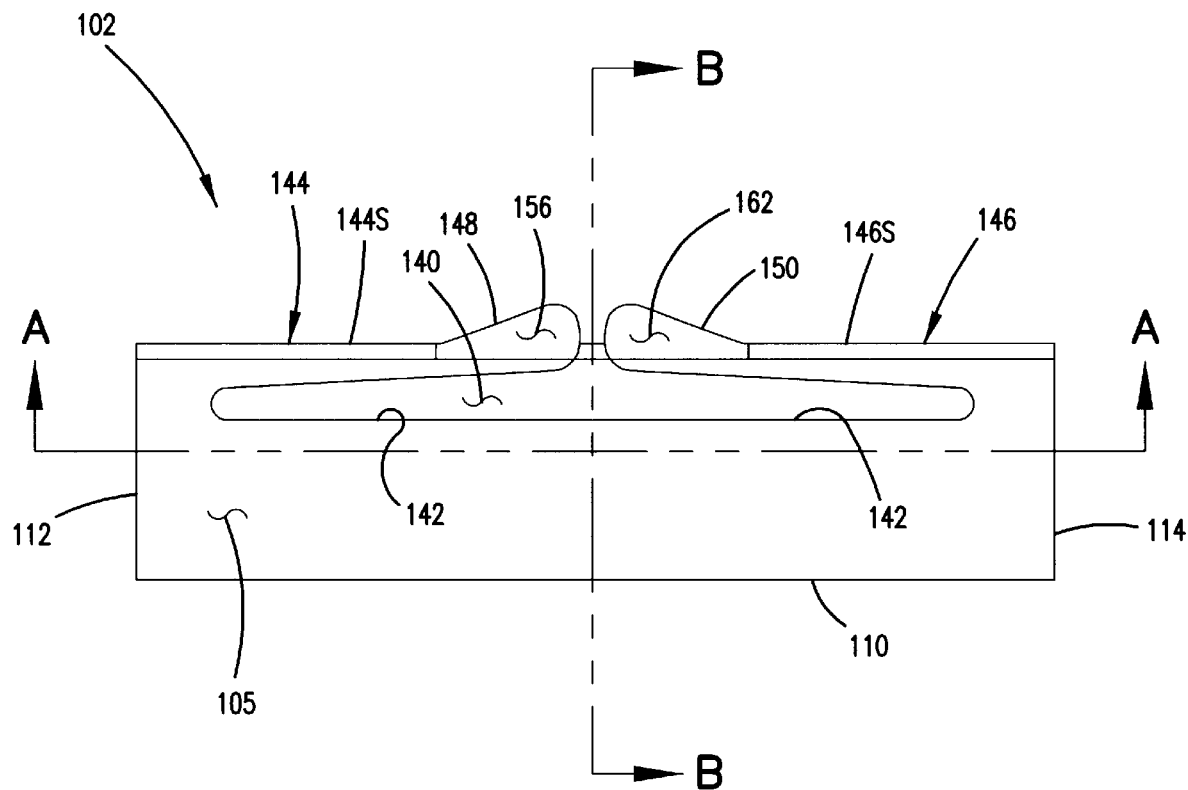
FIG. 9 is a lower plan view of an alternative configuration of the FIG. 3 cover.

FIGS. 6 and 9 illustrate alternative embodiments of the tabs 148, 150 within the cover 102, thereby facilitating or preventing the removal of the cover 102 from the faceplate of the pay telephone. For example, the cover 102 can be made so that it can be removed from the exterior of the faceplate if the tabs 148, 150 angle out smoothly from the cantilevered arms 144, 146, as shown in FIG. 9. This cover 102 can be removed by inserting thin, flexible shims between the left and right cover edge surfaces 144S, 146S, and the contiguous recess walls of the faceplate, and then sliding the shims toward each other. This action raises the cantilevered arms 144, 146, so that the tapered tabs 148, 150 slightly clear the recess' lower edge. The cover 102 can then easily be popped out. It is even possible to use a single flexible shim (such as a thin plastic card) to raise both arms 144, 146, and then pop the cover 102 out.

In another example, it is also possible to implement the cover 102 so that it cannot be removed by having the tabs 148, 150 join the cantilevered arms 144, 146 at an abrupt angle, as shown in FIG. 6. The flexible shims used with this cover 102 will catch on the tabs 148, 150, and will not be able to deflect the arms 144, 146 upwards.

Preferably, the cover 102 is fabricated from a waterclear polycarbonate polished to an SPI A-2 finish, and has the dimensions 1.824 inches (length)×0.461 inch (width)×0.161 inch (height). Face 104 is 0.411 inch in width, and beveled portion 108 is 0.050 inch in depth. Angle α is 3.04°; angle β is 6.975°. Surfaces 156, 158 are each beveled at an angle of 35°, and edges 160, 162 are each beveled at an angle of 20°. Tabs 148, 150 are each 0.200 inch in width. Pocket 125 is 1.724 inches in width, 0.058 inch in height, and 0.361 inch in depth. Projections 126, 128, 129 are each 0.027 inch in height, resulting in about 0.031 inch clearance for insertion of number plate 66 which typically is about 0.020 inch in thickness.

Referring again to FIG. 3, when backing plate 68 is attached to housing 62, a rectangular-shaped recess 170 is formed having a top edge 172, bottom edge 174, first and second lateral edges 176, 178, top wall 180 (not shown), bottom wall 182 (not shown), and first and second side walls 184 (not shown), 186 (not shown). After the number plate 66 is inserted into pocket 120, the cover 102 is installed within the recess 170 by first engaging the lip 108 with top edge 172 and top wall 180, and pushing the cover downwards along edge 116 so that the apex edge portions of 160, 162 of tabs 148, 150, respectively, contact bottom edge 174. This contact causes the arms 144, 146 to flex upwardly so that edges 160, 162 slide downwardly past edge 174 and contact the bottom wall 182. Pushing downward on face 104 pushes the cover 102 deeper into recess 170 until face 105 contacts the backing plate 68. The resiliency of arms 144, 146 causes the apex edge portions of 160, 162 to maintain pressure against the wall 182, preventing the cover 102 from being easily removed.

Cover 102 may be extracted from the recess 170 by inserting a thin, flexible shim between face 112 and wall 184, and between face 114 and wall 186, and sliding the shims toward each other. This action raises the arms 144, 146, so that the apex edge portions of 160, 162 slide upwardly past the edge 174, whereupon the cover can be easily popped out of the recess.

This concludes the description of the preferred embodiment of the invention. The following paragraphs describe some alternative methods of accomplishing the same objects. For example, the cover could be made from any number of materials other than a water-clear polycarbonate plastic as recited herein. Furthermore, the dimensions and geometry of the components of the cover need not follow exactly the description in this specification.

In summary, a plastic number plate cover is described, which can be installed and removed from the exterior of the housing faceplate of a public telephone and which is resistant to tampering. The cover includes an envelope-shaped pocket into which a number plate or card is inserted, and opposed cantilever arms each terminating in a tab having a beveled edge. The cover is inserted into a rectangular-shaped recess on the faceplate when the tabs are brought into contact with a recess edge, causing the arms to flex and allowing the beveled edges to slide past the recess edge.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A number plate cover that is externally installed into a housing faceplate of a public telephone, the cover is resistant to tampering, the cover comprising a parallelepiped having side faces, a top face, a bottom face and an open front face to form an envelope-shaped pocket into which a number plate is inserted, and at least one cantilevered arm attached to the parallelepiped, the arm terminating in a tab wherein the arm is parallel to the bottom face of the parallelepiped, the cover being retained in a generally rectangular-shaped recess on the housing faceplate when the tab engage an edge of the recess.

2. The number plate cover of claim 1, wherein the arm flex outward from the cover to engage the tab with the edge of the recess on the housing faceplate.

3. The number plate cover of claim 1, wherein the arm flex inward within the cover to allow the cover to be inserted into the recess on the housing faceplate.

4. A cover for a telephone number plate enabling installation within a recess on an exterior surface of a pay telephone faceplate, comprising:

a generally rectangular parallelepiped having a predetermined height between an upper face and a lower face, a predetermined length between a first lateral face and a second lateral face, and a predetermined width between a top first edge surface and a bottom second edge surface, the length greater than the width and the width greater than the height, the upper face having a longitudinal portion proximal to the top edge surface and extending between the lateral faces, the parallelepiped having a pocket generally parallel to the upper and lower faces, the lower face having a longitudinal slot open proximally to the bottom edge surface; and opposed, symmetric cantilevered first and second arms connected to the parallelepiped, wherein the arms are parallel to the lower face, each arm having a central portion and a tab portion, each tab portion canted with respect to the central portion and extending beyond the plane of the bottom edge surface, each tab portion having a beveled edge having an apex portion generally parallel to the bottom edge surface.

5. The cover of claim 4, further comprising means for retaining a number plate within the pocket.

6. The cover of claim 5, wherein said means for retaining a number plate within the pocket comprises a plurality of number plate support projections rigidly disposed within the pocket.

7. The cover of claim 4, further comprising means for installing the cover within the recess.

8. The cover of claim 7, wherein said means for installing the cover within the recess comprises a beveled longitudinal portion of the upper face and the apex portion of the beveled edge of each of the tab portion.

9. The cover of claim 4, further comprising means for removing the cover from the recess.

10. The cover of claim 9, wherein said means for removing the cover from the recess comprises a beveled longitudinal portion of the upper face, and the apex portion of the beveled edge of each of the tab portion.

11. The cover of claim 4, wherein the cover is fabricated from a water-clear polycarbonate plastic.

12. A cover for a telephone number plate enabling installation within a recess on the exterior surface of a pay telephone faceplate, the cover comprising a generally rectangular parallelepiped comprising:

a generally planar upper face having a predetermined length and a predetermined width, and including a beveled lip along a first top longitudinal edge determined by a generally planar top edge surface generally orthogonal to the upper face;

opposed generally parallel and planar lateral faces, having the width of the upper face and a predetermined height, generally orthogonal to the upper face and top edge surface;

a generally planar bottom edge surface opposed and generally parallel to the top edge surface, the bottom edge surface having a first longitudinal slot of a predetermined width and a predetermined height, the slot being the exterior aperture of a pocket of said height extending within the parallelepiped, the pocket determined by generally planar upper and lower interior surfaces generally parallel to the upper and lower faces;

a generally planar lower face opposed and generally parallel to the upper face and generally orthogonal to the top edge surface and lateral faces, the lower face having a second longitudinal slot determined by a continuous rectilinear edge distal to the bottom edge surface, and further determined by opposed first and second edges proximally open to the bottom edge surface and canted at a first predetermined angle with respect to the rectilinear edge; and opposed, symmetric first and second cantilever arms, each arm having a central portion and terminating in a tab portion attached to the central portion, wherein the arms are attached to a longitudinal bottom edge and are parallel to the lower face.

13. The cover of claim 12, further comprising first, second and third number plate support projections depending upwardly from the lower interior surface of the pocket.

14. The cover of claim 12, wherein the interior perimeters of the central portions and tab portions are determined, respectively, by said first and second edges of the second longitudinal slot.

15. The cover of claim 12, wherein the each tab portion is canted at a second predetermined angle with respect to the attached central portion to extend beyond the plane of the bottom edge surface.

16. The cover of claim 12, wherein the each tab portion has a planar upper surface and a lower surface beveled at a third predetermined angle, the surfaces determining an edge beveled at a fourth predetermined angle and having an apex portion generally parallel to the bottom edge surface.

17. The cover of claim 12, wherein the cover is fabricated from a water-clear polycarbonate plastic.

18. A cover for a telephone number plate enabling installation within a recess on the exterior surface of a pay telephone faceplate, the cover comprising:

a generally rectangular parallelepiped having a top face, a bottom face, a back face, two side faces and an open front face, which forms an envelope for the insertion of material carrying a telephone number, wherein the cover is substantially rigid and inflexible; and at least one flexible, cantilever arm having a central portion and terminating in a tab portion attached to the central portion, wherein the arm is attached to and in a plane parallel with the bottom face and the arm flexes in the plane parallel to the bottom face, for insertion into or extraction from a housing faceplate of a public telephone.

19. A cover for a telephone number plate enabling installation within a recess on the exterior surface of a pay telephone faceplate, the cover comprising:

a generally rectangular parallelepiped having a top face, a bottom face, a back face, two side faces and an open front face;

an open slot in the bottom face adjacent to the open front face, wherein the open slot forms two opposed, symmetric, cantilever arms; and tab portions attached to the arms which extend beyond the plane of the bottom edge surface, each tab portion having a beveled edge having an apex portion generally parallel to the bottom edge surface.

20. The number plate cover of claim 19, wherein the arms flex outward from the cover to engage the tabs with an edge of a recess on the telephone faceplate.

21. The number plate cover of claim 19, wherein the number plate is removable from the telephone faceplate after installation without dismantling of the faceplate from the telephone.

22. The number plate cover of claim 19, wherein the number plate is not removable from the telephone faceplate after installation without dismantling of the faceplate from the telephone.

23. The cover for a telephone number plate of claim 18 wherein the envelope protects the material carrying a telephone number from damage by rain.

* * * * *